(12) United States Patent
Pack et al.

(10) Patent No.: US 11,831,510 B2
(45) Date of Patent: Nov. 28, 2023

(54) PROGRAMMABLE SWITCH-BASED SERVICE FUNCTION CHAINING SYSTEM AND METHOD

(71) Applicant: KOREA UNIVERSITY RESEARCH AND BUSINESS FOUNDATION, Seoul (KR)

(72) Inventors: Sangheon Pack, Seoul (KR); Jaewook Lee, Seoul (KR); Haneul Ko, Sejong-si (KR); Hochan Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 264 days.

(21) Appl. No.: 17/296,352

(22) PCT Filed: Aug. 13, 2019

(86) PCT No.: PCT/KR2019/010303
§ 371 (c)(1),
(2) Date: May 24, 2021

(87) PCT Pub. No.: WO2020/105842
PCT Pub. Date: May 28, 2020

(65) Prior Publication Data
US 2022/0103658 A1 Mar. 31, 2022

(30) Foreign Application Priority Data
Nov. 23, 2018 (KR) .......................... 10-2018-0146621

(51) Int. Cl.
*H04L 41/0895* (2022.01)
*H04L 47/2483* (2022.01)
(Continued)

(52) U.S. Cl.
CPC ...... *H04L 41/0895* (2022.05); *H04L 47/2483* (2013.01); *H04L 49/70* (2013.01); *H04L 69/22* (2013.01)

(58) Field of Classification Search
CPC ................................................... H04L 41/0895
See application file for complete search history.

(56) References Cited

U.S. PATENT DOCUMENTS 10,116,553 B1 * 10/2018 Penno ................... H04L 45/306
2015/0358235 A1 12/2015 Zhang et al.
(Continued)

FOREIGN PATENT DOCUMENTS

KR  10-2016-0116622 A  10/2016

OTHER PUBLICATIONS

Hancock, David, et al., "Hyper4: Using p4 to Virtualize the Programmable Data Plane," *Proceedings of the 12th International on Conference on emerging Networking Experiments and Technologies*, 2016 (pp. 1-15).
(Continued)

*Primary Examiner* — Jason E Mattis
(74) *Attorney, Agent, or Firm* — NSIP Law

(57) ABSTRACT

A service function chaining system is provided. The service function chaining system includes a PDP management module implementing SFC entities in consideration of an order of a service function chain (SFC) on a programmable data plane (PDP) and an SFC management module that transmits a first SFC entity information, which is information on SFC entities to be implemented on the PDP, to the PDP management module or transmits an SFC rule to a node included on the PDP, and the PDP management module includes a receiving unit for receiving the first SFC entity information, a processing unit for generating a second SFC entity information by processing the first SFC entity information to
(Continued)

enable the SFC entities to be implemented on the PDP and to be processed according to an SFC order, and implementing unit for implementing the SFC entities on the PDP using the second SFC entity information.

6 Claims, 10 Drawing Sheets

(51) Int. Cl.
    *H04L 49/00*     (2022.01)
    *H04L 69/22*     (2022.01)

(56) References Cited

U.S. PATENT DOCUMENTS

2017/0251065 A1*   8/2017  Furr .................. H04L 45/64
2018/0302319 A1*  10/2018  Zhang ............... H04L 69/22
2019/0319879 A1*  10/2019  K ...................... H04L 41/40

OTHER PUBLICATIONS

Li, Hongyu et al., "Service Function Chaining (SFC) Control Plane Components & Requirements", Expires May 28, 2016 (pp. 1-81).
Bottorff, Paul et al., "Ethernet MAC Chaining", *Network Working Group*, Expires Jan. 22, 2017 (pp. 1-24).
International Search Report dated Nov. 22, 2019 in counterpart International Patent Application No. PCT/KR2019/010303 (2 pages in English and 2 pages in Korean).

* cited by examiner

| 0 0 | 1 | 2 | 3 | 4 | 5 | 6 | 7 | 8 | 9 | 1 0 | 1 | 2 | 3 | 4 | 5 | 6 | 7 | 8 | 9 | 2 0 | 1 | 2 | 3 | 4 | 5 | 6 | 7 | 8 | 9 | 3 0 | 1 |
|---|---|---|---|---|---|---|---|---|---|---|---|---|---|---|---|---|---|---|---|---|---|---|---|---|---|---|---|---|---|---|---|
| Ver | O | U | TTL | | | | | Length | | | | | | U | U | U | U | MD Type | | | | Next Protocol | | | | | | | | | |
| Service Path Identifier | | | | | | | | | | | | | | | | | | | | | | | Service Index | | | | | | | | |
| Fixed-Length Context Header | | | | | | | | | | | | | | | | | | | | | | | | | | | | | | | |

PROGRAMMABLE SWITCH-BASED SERVICE FUNCTION CHAINING SYSTEM AND METHOD

CROSS REFERENCE TO RELATED APPLICATIONS

This application is a U.S. National Stage Application of International Application No. PCT/KR2019/010303, filed on Aug. 13, 2019, which claims the benefit under 35 USC 119(a) and 365(b) of Korean Patent Application No. 10-2018-0146621, filed on Nov. 23, 2018, in the Korean Intellectual Property Office, the entire disclosure of which is incorporated herein by reference for all purposes.

TECHNICAL FIELD

The present disclosure relates to a service function chaining (SFC) system and method thereof, and more particularly, relates to a service function chaining system capable of implementing and supporting service functions (SFs) in a programmable switch in consideration of SFC characteristics and a method thereof.

BACKGROUND ART

Network operators manage traffic on the network through a network function (or service function, hereinafter referred to as NF or SF). Here, a set of SFs that process traffic according to the purpose of the operator is referred to as a network function chain or a service function chain (hereinafter referred to as SFC). That is, traffic is processed through the chain defined by the operator, and thus the operator manages the traffic on the network. The SF processes traffic in the network through a general-purpose server or a specific device for the SF. That is, a traffic path in the network is set depending on location of a general-purpose server or specific device to implement the SF, and therefore the network path is inefficient, and in particular, there is a problem that it is difficult to meet the requirements of traffic requiring low latency.

Meanwhile, for efficient traffic routing, research is being conducted to implement SF (for example, Firewall, DPI, NAT, etc.) on a programmable data plane (PDP) that allows network users to program the desired functions in the data plane. As an example, there is a research in which software-based layer-4 load balancing function in a data center may be implemented on the PDP through P4 language to ensure load balancing and continuity of connectivity between users and servers at a line-rate speed. As another example, there is a research in which a cache layer in the PDP's in-memory storage may be implemented to relieve the load caused by service requests in a key-value storage-based data center, and to provide a fast response time through the cache layer in the switch. However, since the above-described researches have a problem of handling all traffic passing through the PDP in which the SF is implemented, there is a need to implement the SF in the PDP in consideration of SFC characteristics.

DETAILED DESCRIPTION OF THE DISCLOSURE

Technical Problem

An object of the present disclosure is to provide a programmable switch-based service function chaining system in which service functions (SFs) are implemented in a programmable data plane (PDP), taking into account the characteristics of the service function chain (SFC), and therefore, when the SFs are implemented in the PDP, it is possible to solve the problem of handling all traffic passing through the PDP.

Technical Solution

A service function chaining system according to an embodiment of the present disclosure includes a PDP management module implementing SFC entities in consideration of an order of a service function chain (SFC) on a programmable data plane (PDP) and an SFC management module that transmits a first SFC entity information, which is information on SFC entities to be implemented on the PDP, to the PDP management module or transmits an SFC rule to a node included on the PDP, and the PDP management module includes a receiving unit for receiving the first SFC entity information, a processing unit for generating a second SFC entity information by processing the first SFC entity information to enable the SFC entities to be implemented on the PDP and to be processed according to an SFC order, and implementing unit for implementing the SFC entities on the PDP using the second SFC entity information.

A service function chaining method according to an embodiment of the present disclosure includes receiving a first SFC entity information, which is information on service function chain (SFC) entities to be implemented on a programmable data plane (PDP), generating a second SFC entity information by processing the first SFC entity information such that the SFC entities are capable of processing the packet according to an SFC order, defining a parser for extracting a header from the packet and a deparser for combining the header extracted from the packet, and implementing the SFC entities on the PDP using the parser, the second SFC entity information, and the deparser.

Advantageous Effects of the Disclosure

According to an embodiment of the present disclosure, the SFs are implemented in the PDP in consideration of SFC characteristics, thereby solving the problem of handling all traffic passing through the PDP when the SFs are implemented in the PDP, and satisfying the requirements of the SFC at the high processing speed.

In addition, since the switch defines the match keys and actions directly in the switch of the PDP, various SFs that are not supported by Openflow may be implemented in the switch.

BEST MODE

Figures 1, 2:
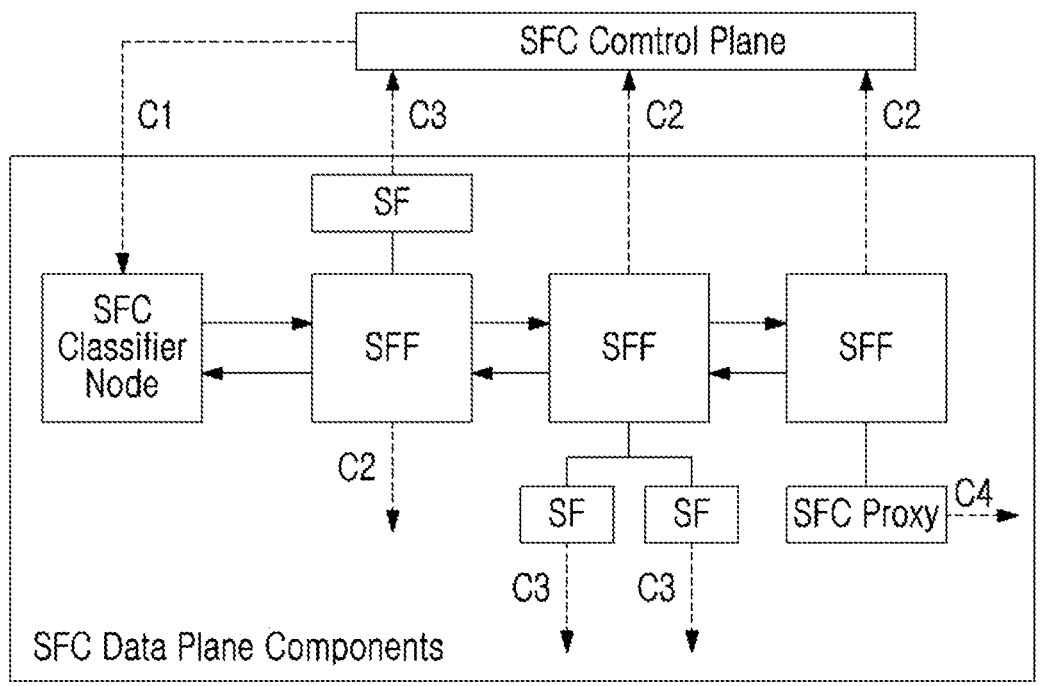
FIG. 1 illustrates a conventional service function chaining (SFC) environment.
FIG. 2 illustrates a structure of a network service header (NSH).

Disclosed hereinafter are exemplary embodiments of the present invention. Particular structural or functional descriptions provided for the embodiments hereafter are intended merely to describe embodiments according to the concept of the present invention. The embodiments are not limited as to a particular embodiment.

Terms such as "first" and "second" may be used to describe various parts or elements, but the parts or elements should not be limited by the terms. The terms may be used to distinguish one element from another element. For instance, a first element may be designated as a second element, and vice versa, while not departing from the extent of rights according to the concepts of the present invention.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Hereinafter, exemplary embodiments of the present disclosure will be described in detail with reference to the accompanying drawings. However, the scope of the patent application is not confined or limited by these embodiments. The same reference numerals in each drawing indicate the same members.

Hereinafter, a programmable switch-based service function chaining system and a method thereof will be described in detail with reference to FIGS. 1 to 11.

FIG. 1 illustrates a conventional service function chaining (SFC) environment.

Referring to FIG. 1, a service function chaining (SFC) is standardized by the internet engineering task force (IETF), and the standardized SFC environment is a control plane and a data plane (or a user plane).

The data plane consists of SFC entities. Each SFC entity which refers to a logical object that processes packets in the SFC environment may include an SFC classifier, a service function forwarder (hereinafter, SFF), an SFC proxy, and a service function (hereinafter, SF). In addition, a network composed of the SFC entities may be referred to as an SFC-enabled domain (or network). The SFC entities process packets encapsulated by a network service header (hereinafter, NSH).

Referring to FIG. 2, which illustrates a structure of a network service header (NSH), a chain to be followed for each flow is classified by a service path identifier (hereinafter, SPI) in the NSH, and the flow recognizes how many SF instances have been processed in the chain, through a service index (SI). The SFC entities read the NSH, and each entity performs a different role. The roles performed by each entity are as follows.

1) SFC classifier: The SFC classifier inserts the NSH into the incoming packet header to perform SFC encapsulation. Which NSH to insert is determined in the control plane of the SFC environment, and an SFC encapsulation rule is given to the SFC classifier. Here, the encapsulation rule may mean information to be included in the NSH to be inserted into the packet.

2) SFF: The SFF reads the SPI and SI of NSH inserted in the packet header, and then delivers the packet depending on a predefined forwarding rule. The forwarding rule is defined in the control plane of the SFC environment and given down to the SFF.

3) SF: The SF may include SFC-aware SF and SFC-unaware SF. The SFC-aware SF processes NSH-inserted packets depending on its own network function, and corrects the SI after processing. Meanwhile, in the case of the SFC-unaware SF, the NSH header processing cannot be performed, and packets in which the NSH header is inserted cannot be processed.

4) SF proxy: The SF proxy de-capsulates the NSH from the packet header to allow the above-described SFC-unaware SF to process a packet, transmits the packet to the SF, encapsulates the NSH into the packet header received from the SF, and modifies the SI.

Figure 3:
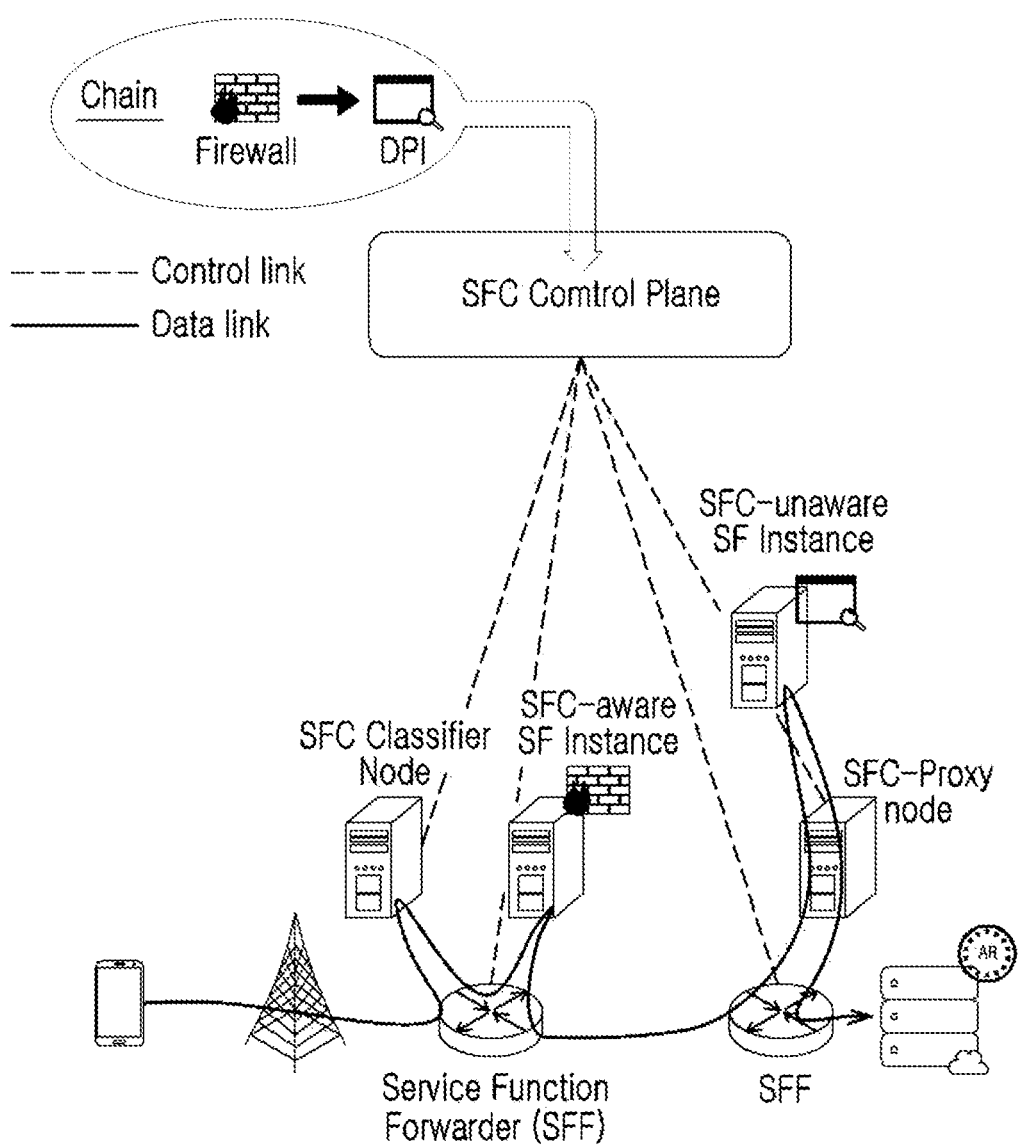
FIG. 3 illustrates a conventional SFC system.

FIG. 3 illustrates a conventional SFC system.

Referring to FIG. 3, in the conventional SFC system, a problem arises in that a user sets an inefficient path through which all SFC entities should pass for receiving a specific service from a server. For example, when the SFC is set to perform firewall and DPI sequentially, the SFF forwards the packet to the SFC classifier and encapsulates the NSH into the packet from the SFC classifier and transmits it back to the SFF, the firewall SF receives the packet, processes the packet depending on function, and transmits it back to the SFF, and the DPI SF receives the packet, processes the packet depending on the function, and transmits it to the server. Also, since the DPI SF is the SFC-unaware SF, the packet delivered to the DPI SF should go through the SF proxy.

The problem of the conventional SFC system may be solved by implementing SF entities on a programmable data plane (PDP), but in this case, a problem of handling all traffic passing through the PDP occurs. For example, even when a user defines that only NAT function is processed for some traffic and only firewall function is processed for some traffic, both functions are processed when NAT SF and firewall SF are implemented in the PDP along a path. This causes a problem in that the firewall may drop the traffic that only needs NAT, and the NAT may modify the header of the traffic that only needs the firewall. This problem arises because the SF is simply implemented in the PDP without considering the SFC characteristics. Accordingly, the present disclosure proposes a system and method capable of implementing the SF entities on the PDP in consideration of the SFC characteristics.

Figure 4:
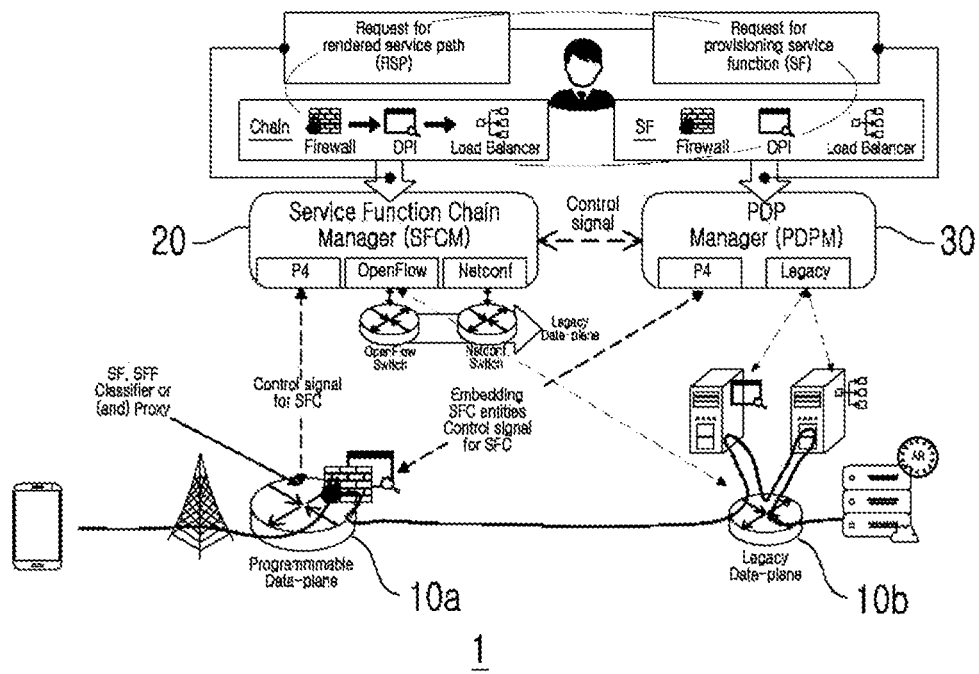
FIG. 4 illustrates an SFC system according to an embodiment of the present disclosure.

FIG. 4 illustrates an SFC system according to an embodiment of the present disclosure.

Referring to FIG. 4, an SFC system 1 according to an embodiment of the present disclosure includes a control plane and a data plane. Here, the data plane may mean a programmable PDP. In addition, at least one of nodes 10a and 10b is included in the data plane, and an SFC management module 20 and a PDP management module 30 are included in the control plane.

The nodes 10a and 10b may be network devices, and may refer to functional elements that forward, switch, or route traffic or packets, such as a switch or a router. For example, at least one of network devices may refer to switches, routers, switching elements, routing elements, or forwarding elements defined by OpenFlow, IETF, ETSI, and/or ITU-T, etc. It is obvious that the number of at least one of network devices shown in FIG. 4 does not limit the scope of the present disclosure. In addition, each of the at least one of network devices may include a storage space (memory or storage unit, etc.) for storing and managing programs implemented from the PDP management module 30. Since the nodes 10a and 10b are included on the PDP, a function desired by a network user may be programmed.

The SFC management module 20 included in the control plane is a module for SFC management. The SFC management module 20 sets an SFC rule such as an encapsulation rule or a forwarding rule, and transmits the SFC rule to the nodes 10a and 10b included in the PDP. Accordingly, the SFC entities implemented in the nodes 10a and 10b included in the PDP process packets based on the SFC rules. In addition, the SFC management module 20 transmits SFC entity information to the PDP management module 30 to be described later. The SFC entity information includes a match field and an action field in which functions performed by each SFC entity on a packet are defined. The SFC entities perform a function defined in an action field paired with a corresponding match field for a packet that matches the information defined in each match field.

The SFC management module 20 may be connected to the PDP management module 30 for transmitting SFC entity information, and may also be connected to the nodes 10a and 10b included on the PDP and on the existing data plane to perform the SFC management function.

The PDP management module 30 included in the control plane is a module for PDP management. The PDP management module 30 receives a first SFC entity information, which is information on the SFC entities to be implemented on the PDP, generates a second SFC entity information by processing the first SFC entity information such that the packets are capable of being processed according to the SFC order after the SFC entities are implemented on the PDP, and embeds the SFC entities on the PDP using the second SFC entity information. A detailed description of the PDP management module 30 will be described later with reference to FIG. 5.

Figure 5:
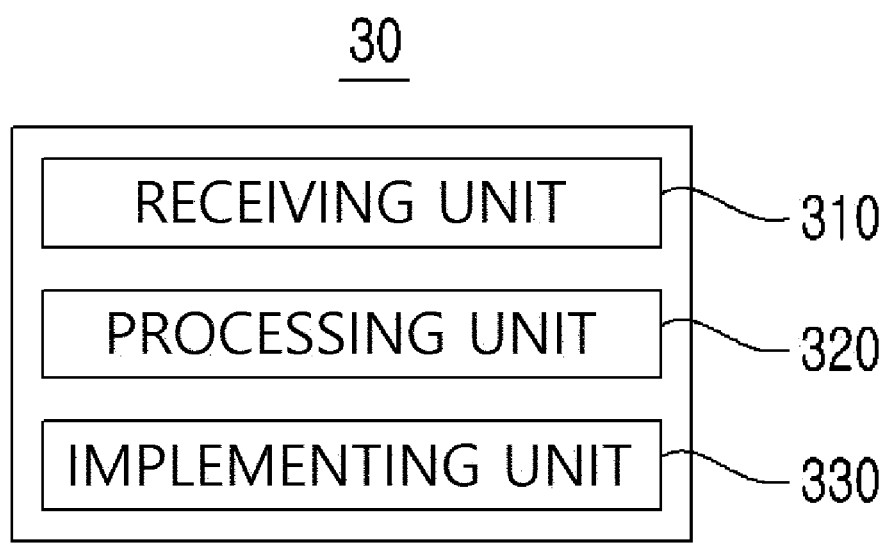
FIG. 5 is a block diagram of a programmable data plane (PDP) management module included in an SFC system according to an embodiment of the present disclosure.

FIG. 5 is a block diagram of a PDP management module included in an SFC system according to an embodiment of the present disclosure.

Referring to FIG. 5, the PDP management module 30 includes a receiving unit 310, a processing unit 320, and an implementing unit 330.

The receiving unit 310 receives the first SFC entity information from the user or SFC management module. The first entity information refers to information on the SFC entities that the user intends to implement on the PDP among the SFC entities constituting the data plane of the SFC environment. The receiving unit 310 may receive information on the SF among the first SFC entity information from the user, and information on the SFC classifier, the SFF, and the SFC proxy may be received from the SFC management module, but is not limited thereto.

The processing unit 320 processes the first SFC entity information sand generates the second SFC entity information to enable the packets to be processed according to the SFC order after the SFC entities are implemented on the PDP.

Figure 6:
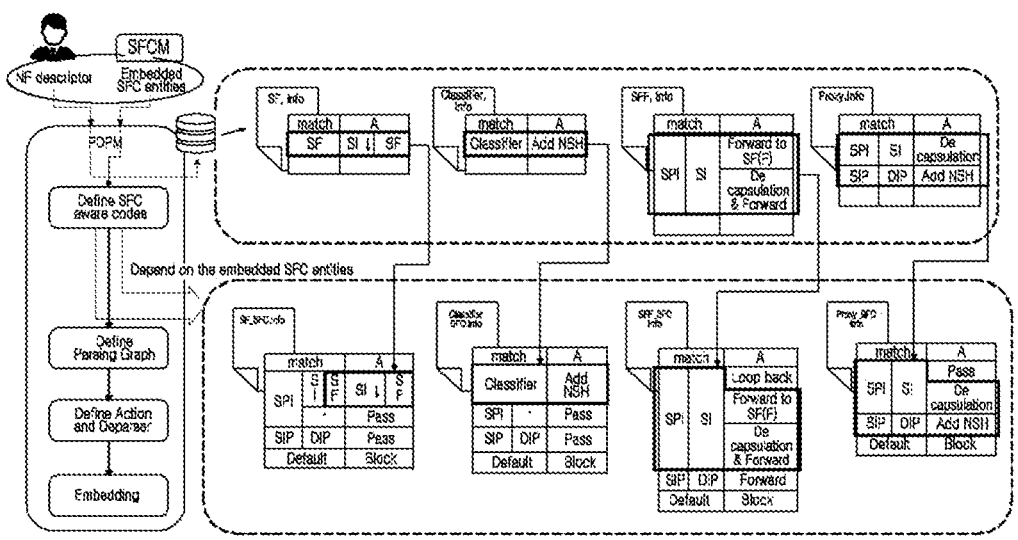
FIG. 6 is a diagram illustrating a process of processing SFC entity information.

Referring to FIG. 6, which is a diagram illustrating a process of processing SFC entity information, the processing unit 320 processes the first SFC entity information and generates the second SFC entity information to consider the SFC characteristics, while maintaining the unique match/action field of each SFC entity. To this end, the processing unit 320 processes SFC entity information, which is information on each SFC entity, as follows.

1. Processing of SFC Entity Information for SF

Since the conventional SF does not take into account the SFC characteristics, when implemented on the PDP as it is, there is a problem of processing all packets coming to the implemented node according to the order in which the SF is implemented. Therefore, there is a problem that the SFC order is not satisfied. To solve this problem, the processing unit 320 adds the NSH including the SPI and SI in the match field of the first entity information for the SF such that the SF processes the packet according to the predetermined SFC order. Accordingly, the SF implemented depending on the processed entity information may process the packet in consideration of not only the characteristics of the SF, but also the NSH including the SPI, which is information on the SFC order.

In addition, when SF and SFC proxy are implemented on the PDP at the same time, to prevent SF from dropping the packet in which the NSH is extracted by the SF proxy, source IP (SIP)/destination IP (DIP) and a pass operation may be added to the match field and the action field of the first entity information for the SF, respectively.

2. Processing of SFC Entity Information for SFF

As described above, since there is a problem in that packets are processed according to the order in which SF is implemented, although the SF entities are implemented in the same node, it is difficult to process the packets in the SFC order when the implemented order and the SFC order do not match. To solve this, the processing unit 320 adds a loopback operation to the action field of the first entity information for the SFF. Therefore, even when the packet passes through the SFC entity at the end, it may be returned to the SFC entity at the first end, and thus the packet may be delivered according to the SFC order.

3. Processing of SFC Entity Information for SFC Classifiers

When the SFC classifier on the PDP is implemented at the same time as the SF, the processing unit 320 adds the SPI to the match field such that the SFC classifier does not drop the packet returned by the loopback operation of the SFF.

In addition, when the SFC classifier on the PDP is implemented at the same time as the SFC proxy, the processing unit 320 adds SIP/DIP and pass operation to the match field and the action field, respectively, to prevent SF from dropping the packet in which the NSH is extracted from the SFC proxy.

4. Processing of SFC Entity Information for SFC Proxy

The processing unit 320 adds a pass-through operation to the action field paired with an NSH-defined match field such that the SFC proxy does not drop the packet for the SFC aware SF.

As described above, the first SFC entity information, which is the information on each SFC entity, is processed to generate the second SFC entity information (SF_SFC, Classifier_SFC, SFF_SFC, Proxy_SFC) as shown in FIG. 6.

The implementing unit 330 may define a parser for extracting a header from the packet and a deparser for combining the header extracted from the packet, and may embed the parser and the deparser together with the SFC entities on the PDP. Also, when defining the parser, the implementing unit 330 may generate a parsing graph necessary for the parser to extract the header from the packet.

Figure 7:
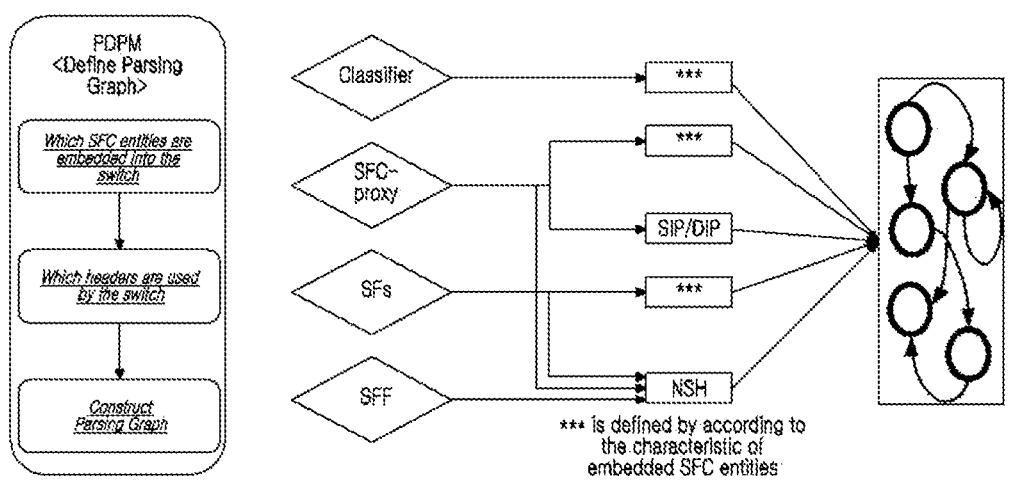
FIG. 7 is a diagram illustrating a process of generating a parsing graph.

Referring to FIG. 7, which is a diagram illustrating a process of generating a parsing graph, the implementing unit 330 generates the parsing graph using the second SFC entity information. More specifically, the implementing unit 330 checks which SFC entities are implemented on the PDP among SFC entities, checks which headers are used by the node when the SFC entities are implemented in the node included in the PDP, and generates the parsing graph based on information on the SFC entities to be implemented on the PDP and information on headers to be used by the node. In the generated parsing graph, ◇ means SFC entities, □ means header, and *** means header defined depending on the characteristics of each SFC entity. For example, when only the SFC classifier and SFF among the SFC entities are implemented on the PDP, a parsing graph is generated to allow the header and NSH required from the SFC classifier and SFF to be extracted. Here, the header required by each SFC entity means a header used for the match field and the action field. When the parsing graph is generated, the parser may extract the header from the packet with reference to the parsing graph.

When the SFC entities are implemented in the node included on the PDP by the PDP management module including the above-described configurations, the PDP management module may generate an application programming interface (API) capable of controlling the SFC entities. The PDP management module may manage the SF implemented on the PDP through the generated API, and the SFC management module may insert the SFC rule on the PDP through the generated API.

Figure 8:
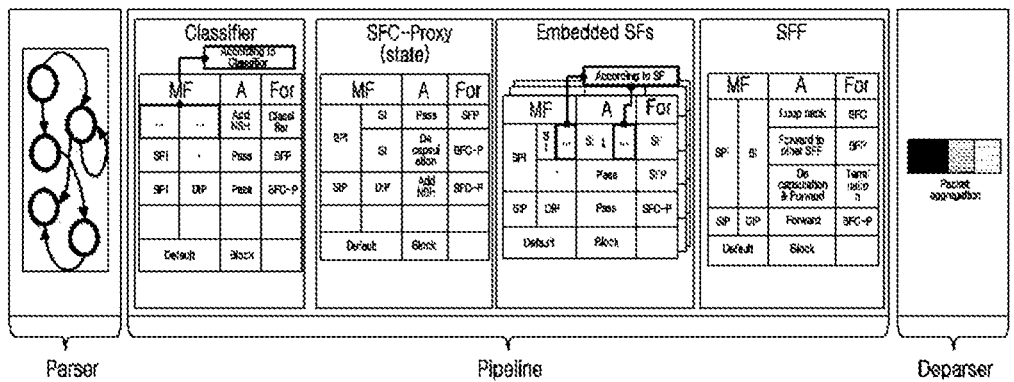
FIG. 8 illustrates a structure of a PDP switch.

FIG. 8 illustrates a structure of a PDP switch.

Referring to FIG. 8, when the SFC entities are implemented in the switch that is the node included on the PDP by the PDP management module according to an embodiment of the present disclosure, the structure of the switch is largely composed of a parser that extracts the header from the packet, a pipeline that operates depending on the extracted header including the SFC entities, and a deparser that combines the extracted headers. Here, the type of the match field and the action field of each SFC entity in the pipeline is defined in the PDP management module, and the key of the match field and the operation of the action field are defined in the SFC management module and the PDP management module. For example, it is defined in the PDP management module that the match field is the NSH and the action is drop, and the match-action field pairs that determine whether the packet with a specific NSH value should be dropped may be defined through the API in the SFC management module and the PDP management module.

In the packet entering the switch having the above-described structure, necessary headers are first extracted through the parser and processed according to the order implemented by the pipeline. For example, in the case of FIG. 8, the packets are processed in the order of SFC classifier→SFC proxy→SF→SFF. Meanwhile, the order of processing is not limited thereto and may be different for each virtualization technique.

Example

Figure 9:
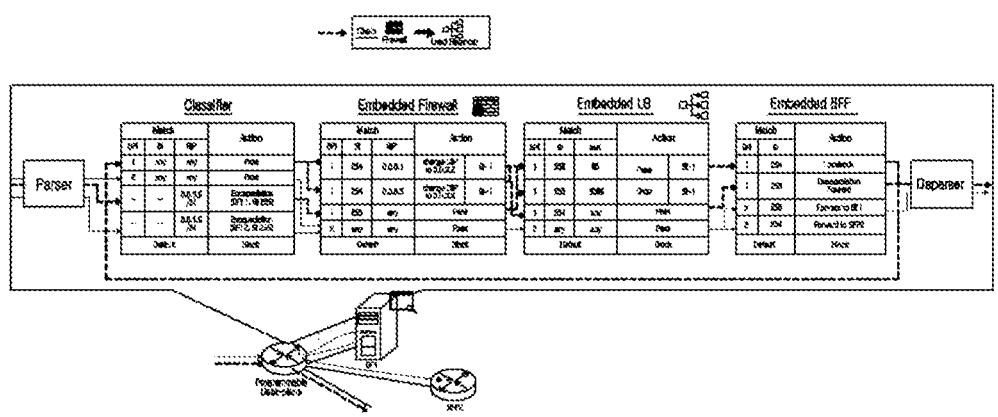
FIG. 9 illustrates a PDP to which an SFC system according to an embodiment of the present disclosure is applied.

FIG. 9 illustrates a PDP to which an SFC system according to an embodiment of the present disclosure is applied.

Referring to FIG. 9, in this embodiment, there are blue packets that should pass sequentially through a firewall and a load balancer, and red packets that pass through SF1 (DPI instance) and other SFs sequentially through SFF2. The SFC classifier function, the firewall function, the load balancer function, and the SFF function are implemented in the PDP of the present embodiment, and field values of match and action table are defined from the SFC management module and the PDP management module.

When the blue packet enters the switch, the header is extracted through the parser, and NSH (SPI 1, SI 255) is added through the SFC classifier. After that, it goes through the implemented firewall SF. Here, since the SPI is 1 and the SI is 255, it is transmitted to the implemented load balancer SF without any other operation. The load balancer SF determines whether to drop the corresponding packet through the SPI/SI/port combination. When the port number is 80 (HTTP packet), the SI is reduced by 1. Then, in SFF, because SPI is 1 and SI is 2, a loopback operation is performed. The packet passes through the SF classifier again, and the SI is reduced by 1 after being processed by the firewall SF. Then, it passes through the load balancer SF, and in SFF, removes and passes the NSH according to SPI and SI (means a case in which all SFCs are processed).

Meanwhile, the red packet is transmitted to SF1 after the NSH is added in the packet through the SFC classifier and passes the SFF. After the packet is processed by the SF1, it is transmitted back to the PDP with the SI value reduced by 1. The red packet entering the PDP is passed through to SFF and forwarded to SFF2.

Figure 10:
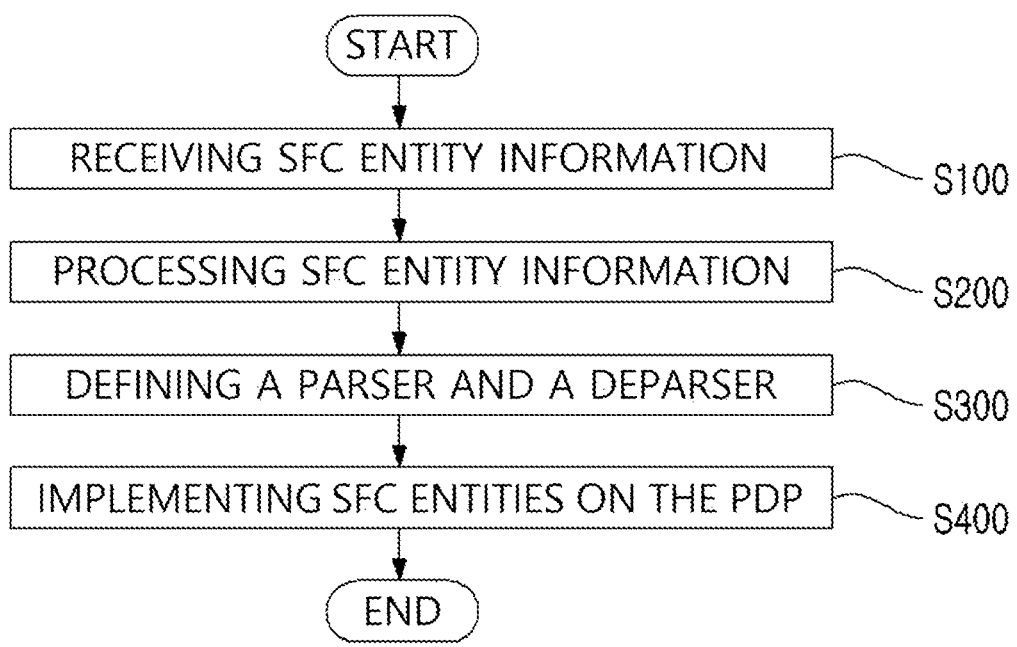
FIG. 10 is a flowchart of an SFC method according to an embodiment of the present disclosure.

FIG. 10 is a flowchart of an SFC method according to an embodiment of the present disclosure. Hereinafter, a detailed description of a part overlapping with the previously described part will be omitted.

Referring to FIG. 10, a service function chain method performed by the service function chaining system according to an embodiment of the present disclosure includes receiving SFC entity information in S100, processing the SFC entity information in S200, defining a parser and a deparser in S300, and implementing SFC entity in S400.

Operation S100 is an operation of receiving a first SFC entity information, which is information on SFC entities to be implemented on the PDP, from a user or an SFC management module.

In S200, the first SFC entity information received through operation S100 is processed. More specifically, a second SFC entity information is generated by processing match/action field data for each of the SFC entities included in the first SFC entity information such that the SFC entities are capable of processing packets according to the SFC order. The processing method of the first SFC entity information is as described above.

In S300, a parser for extracting a header from the packet and a deparser for combining the header extracted from the packet are defined. In addition, operation S300 may further include generating a parsing graph necessary for the parser to extract the header from the packet using the second SFC entity information generated through operation S200.

In S400, the SFC entities are implemented on the PDP using the parser, the second SFC entity information, and the deparser defined and generated through operations S200 to S400.

The SFC system and method thereof according to an embodiment of the present disclosure as described above may secure a lower SFC processing time compared to the conventional SFC system. Equation for comparing processing time of the conventional SFC and proposed SFC are as Equations 1 and 2 below.

$$D_{compared} = \sum_{j \in J} c_{i,j}\left(P_0 + T_1 + \sum_{j' \in J} c_{1,j} T_{h_{i,j}}\right) + \quad \text{[Equation 1]}$$

$$\sum_{i \in I}\left[P_i + 2T_1 + \sum_{j \in J}\left(c_{i,j}S_j + \sum_{j' \in J, j' \neq j} c_{i+1,j}(S_j + T_{h_{i,j}})\right)\right]$$

$$D_{proposed} = \quad \text{[Equation 2]}$$

$$\sum_{j \in J}\sum_{i=0, i \in I}\left[e_{i,j}(1 - e_{i+1,j})(S_j E(Loop) + \sum_{j' \in J, j' \neq j} e_{i+1,j}T_{h_{i,j}}\right]$$

The parameters and variables used in each equation are as follows. The set of SFs is defined as I, and each SF is defined as the element i. Meanwhile, to simplify the formula, when i is 0, it is defined as the SFC classifier function. The set of SFFs is defined as J, and each SFF is defined as element j.

$c_{i,j}$ is an classifier (i.e., when i is 0) or a variable indicating whether SF i is connected to SFF j by one hop. When the variable is 1, it is connected, and when it is 0, it is not connected. The SFC classifier or SFs may be connected to only one SFF by one hop, and multiple SFs and SFC classifier may be connected to the SFF. Similarly, $e_{i,j}$ is a variable indicating whether the SFC classifier (i.e., when i is 0) or whether SF i is implemented in SFF j. When the variable is 1, it is implemented, and when it is 0, it is not implemented. The SFC classifier or SFs may be implemented only in one SFF, and SFF may implement multiple SFs and SFC classifier. $h_{j,j'}$ is a variable representing the number of hops between SFF j and SFF j'. $P_i$, $S_j$, and $T_n$ denote SF i packet processing time, SFF j switching time, and n-hop transmission time, respectively. $P_0$ represents the packet processing time of the SFC classifier.

For the performance comparison of the previous research and the present disclosure, in an environment where there are only two SFFs, and in the SFC, elements of set I are sequentially defined, and the remaining variables are randomly defined, as the number of SFs is increased (i.e., as the defined number of SFs of FC is increased), the SFC minimum, average, and maximum processing times for 10000 times were compared.

Figure 11:
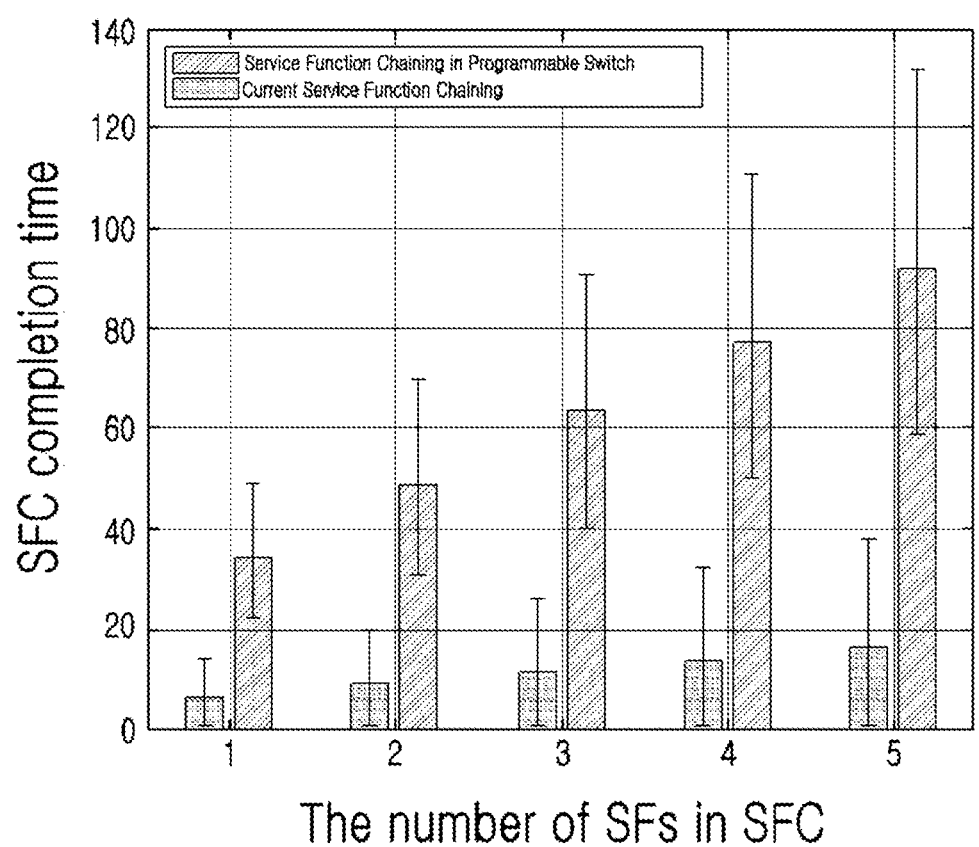
FIG. 11 is a diagram for comparing performance between the present disclosure and a conventional SFC.

FIG. 11 is a diagram for comparing performance between the present disclosure and a conventional SFC.

Referring to FIG. 11, it may be seen from the simulation results that the SFC processing time increases as the SF increases (the SF in the SFC increases). This is because the number of times the packet is processed and the number of transmissions increases as the number of SFs increases. However, in the case of the present disclosure, the increase in SFC processing time is lower than that of the comparison techniques. This is because although the number of SFs increases, multiple SFs may be processed at once when the switch processes packets if the SFF is well implemented in the order of the SFC. For this reason, the minimum SFC processing time of the present disclosure is always constant.

On the other hand, in the conventional SFC method, since the traffic path is determined depending on the chain requested by the user, as the SF increases, the minimum, maximum, and average processing times all increase. Therefore, it is possible to ensure the low processing time through the present disclosure.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents.

Therefore, various other implementations, various other embodiments, and equivalents of the invention disclosed in the claims are encompassed by the scope of claims set forth below.

The invention claimed is:

1. A service function chaining system, the system comprising:
   a PDP management module implementing SFC entities in consideration of an order of a service function chain (SFC) on a programmable data plane (PDP), the SFC entities including an SFC classifier, a service function (SF), a service function forwarder (SFF), and an SFC proxy; and
   an SFC management module that transmits a first SFC entity information including a match field and an action field, which is information on SFC entities to be implemented on the PDP, to the PDP management module or transmits an SFC rule to a node included on the PDP,
   wherein the PDP management module includes:
   a receiving unit for receiving the first SFC entity information;
   a processing unit for generating a second SFC entity information by processing the first SFC entity information to enable the SFC entities to be implemented on the PDP and to be processed according to an SFC order; and
   implementing unit for implementing the SFC entities on the PDP using the second SFC entity information, and
   wherein the generating, by the processing unit, of the second SFC entity information comprises:
   adding a network service header (NSH) including a service path identifier (SPI) and a service index (SI) to the match field of the first SFC entity information for the SF to allow the SF to process a packet according to the SFC order;
   adding a loopback operation to the action field of the first SFC entity information for the SFF; and
   adding a source IP (SIP)/destination IP (DIP) and a pass operation to the match field and the action field of the first SFC entity information, respectively, for the SF when SF and SFC proxy are simultaneously implemented on the PDP to prevent the SF from dropping the packet in which the NSH is extracted by the SF proxy.

2. The system of claim 1, wherein the generating, by the processing unit, of the second SFC entity information further comprises:
   adding the SPI to the match field when the SFC classifier and the SF are simultaneously implemented on the PDP to prevent the SFC classifier from dropping the packet returned by the loopback operation of the SFF; and
   adding the SIP/DIP and the pass operation to the match field and the action field of the first SFC entity information, respectively, for the SFC classifier when the SFC classifier and the SFC proxy are simultaneously implemented on the PDP, to prevent the SFC classifier from dropping the packet in which the NSH is extracted from the SFC proxy. an action field.

3. The system of claim 1, wherein the implementing unit defines a parser for extracting a header from the packet and a deparser for combining the header extracted from the packet, and implements the parser and the deparser on the PDP.

4. The system of claim 3, wherein the implementing unit generates a parsing graph necessary for the parser to extract the header from the packet using the second SFC entity information, and
   wherein the parser extracts the header from the packet with reference to the parsing graph.

5. A service function chain method performed by a service function chaining system, the method comprising:
   receiving a first SFC entity information including a match field and an action field, which is information on service function chain (SFC) entities to be implemented on a programmable data plane (PDP), the SFC entities including an SFC classifier, a service function (SF), a service function forwarder (SFF), and an SFC proxy;
   generating a second SFC entity information by processing the first SFC entity information such that the SFC entities process a packet according to an SFC order;
   defining a parser for extracting a header from the packet and a deparser for combining the header extracted from the packet; and
   implementing the SFC entities on the PDP using the parser, the second SFC entity information, and the deparser,
   wherein the generating of the second SFC entity information comprises:
   adding a network service header (NSH) including a service path identifier (SPI) and a service index (SI) to the match field of the first SFC entity information for the SF, to allow the SF to process the packet according to the SFC order;
   adding a loopback operation to the action field of the first SFC entity information for the SFF;
   adding a source IP (SIP)/destination IP (DIP) and a pass operation to the match field and the action field of the first SFC entity information for the SF, respectively, when SF and SFC proxy are simultaneously implemented on the PDP to prevent the SF from dropping the packet in which the NSH is extracted by the SF proxy;
   adding the SPI to the match field when the SFC classifier and the SF are simultaneously implemented on the PDP to prevent the SFC classifier from dropping the packet returned by the loopback operation of the SFF; and
   adding the SIP/DIP and the pass operation to the match field and the action field of the first SFC entity information, respectively, for the SFC classifier, when the SFC classifier and the SFC proxy are simultaneously implemented on the PDP to prevent the SFC classifier from dropping the packet in which the NSH is extracted from the SFC proxy.

6. The method of claim 5, wherein the defining of the parser and the deparser further includes generating a parsing graph necessary for extracting the header from the packet using the second SFC entity information.

* * * * *